Jan. 19, 1960  H. W. RIMBACH  2,921,912

MAGNESIUM-CALCIUM FLUOROPHOSPHATE

Filed Nov. 1, 1954

INVENTOR.
HENRY W. RIMBACH
ATTORNEY.

United States Patent Office 2,921,912
Patented Jan. 19, 1960

2,921,912

MAGNESIUM-CALCIUM FLUOROPHOSPHATE

Henry W. Rimbach, Bloomfield, N.J., assignor to Westinghouse Electric Corporation, East Pittsburgh, Pa., a corporation of Pennsylvania Application November 1, 1954, Serial No. 465,846

6 Claims. (Cl. 252—301.4)

This invention relates to luminescent materials and, more particularly, to luminescent materials which are adapted for use in black-light generators and in the usual fluorescent lamps.

Advertising display signs are commonly painted with phosphor materials which are energized by a black-light source to produce unusual advertising effects. These visible light producing fluorescent materials are usually cadmium or zinc sulphide types or organic dyes, as are well-known, and such phosphors are normally most responsive to radiation which is peaked between 3500 to 3600 A.U. Since a low pressure mercury discharge is very rich in 2537 A.U. radiation, an additional phosphor is needed to convert the 2537 A.U. to radiation which is peaked near 3600 A.U. Such radiation conversion phosphors are known as black-light phosphors.

Black-light phosphors should have a relatively sharp cut-off before about 4250 A.U. so that there will be no appreciable visible light emanating from the black-light phosphor. Any appreciable visible light emanating from the black-light phosphor constitutes unwanted illumination on the advertising display. Since black-light phosphors should have their radiation peak fairly near the maximum excitation wave length for the visible light producing phosphors, the black-light phosphor spectral distribution curve should be quite sharp. The peak response for the black-light phosphor may be shifted 200 to 300 A.U. from the maximum radiation excitation peak for the visible light producing phosphors of the display, but even with this permissible shift in peak radiation, the range in spectral distribution from peak to maximum wave length cut-off for the black-light phosphors should not exceed about 1000 A.U., with cut-off occurring near 4250 A.U. The minimum wave length cut-off should be of as long a wave length as possible to prevent excessive radiation loss in the envelope of the black-light generator.

It is the general object of this invention to provide an improved black-light phosphor having a very sharp cut-off at about 4250 A.U. and a spectral distribution which is peaked at about 3400 A.U.

It is a further object to provide a visible light producing phosphor having a peak in the yellow range of the spectrum.

It is another object to provide preferred and optimum ranges for the constituents comprising the phosphors of this invention.

The aforesaid objects of the invention, and other objects which will become apparent as the description proceeds, are achieved by providing a magnesium-calcium fluorophosphate which when activated by cerium will act as a black-light phosphor under 2537 A.U. excitation and which when activated by cerium and manganese will fluoresce with a peak in the yellow range of the spectrum under 2537 A.U. excitation.

For a better understanding of the invention, reference should be had to the accompanying drawings, wherein.

Although the phosphor disclosed in this invention may be used in applications other than gas discharge lamps, the invention has particular application to fluorescent type low pressure mercury gas-discharge lamps and hence this type of lamp has been so illustrated and will be so described.

Figure 1:
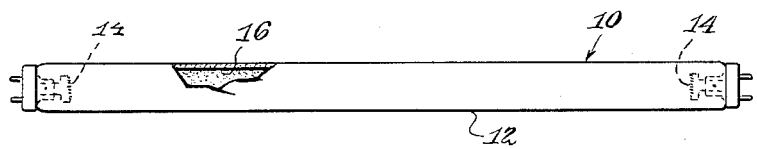
Fig 1 is an elevational view partly in section, of a fluorescent lamp incorporating the phosphor of this invention.

With specific reference to the form of the invention illustrated in the drawings, the numeral 10 in Fig. 1 represents a black-light generator comprising a hollow elongated tubular envelope 12 having electrodes 14 sealed into either end thereof. Contained within the envelope is a charge of mercury and an inert ionizable starting gas, such as argon, at a pressure of 4 mm. Coated on the interior surface of the envelope is the phosphor 16 of this invention. The electrodes may be standard coiled-coil types having a standard triple-oxide emission material coated thereon, such materials being well-known in the fluorescent lamp art. The envelope may be fabricated of lime glass, as is used in the ordinary fluorescent lamp, and this glass will satisfactorily pass for purposes of the intended application, the 3,000 to 4200 A.U. black-light radiation.

The black-light phosphor may be defined broadly as a magnesium-calcium fluorophosphate, activated by cerium. The general formula for the preferred embodiment of this phosphor may be represented as $$0.75Mg_3(PO_4)_2 \cdot 0.25Ca_3(PO_4)_2 \cdot 2.9CaF_2 : 0.04Ce$$

or expressing the alkaline earth materials in whole numbers, $3Mg_3(PO_4)_2 \cdot 1Ca_3(PO_4)_2 \cdot 11.6CaF_2 : 0.16Ce$. While the foregoing formula is an accurate representation of the preferred embodiment of the phosphor, the phosphor may be represented better by what might be termed the amounts of the various material constituents of the phosphor, since the alkaline earth metals and phosphates need not be present in stoichiometric amounts. The foregoing formula may be rearranged to express the molecular proportions of the material constituents of the phosphor as follows: $9MgO \cdot 3CaO \cdot 4P_2O_5 \cdot 11.6CaF_2 : 0.16Ce$.

Figure 2:
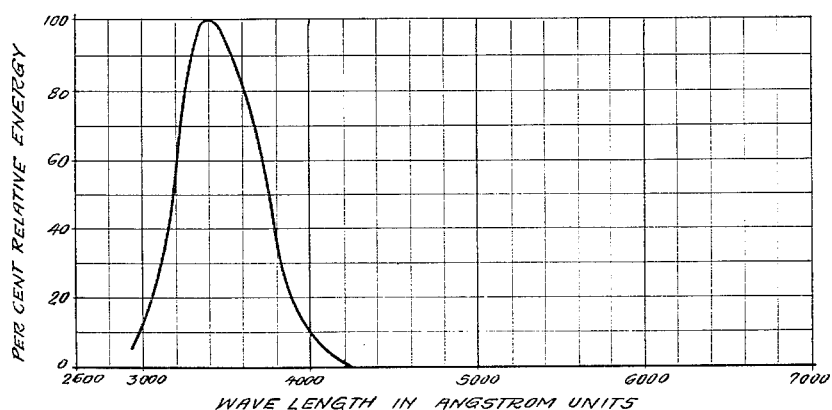
Fig. 2 is a spectral distribution curve of the magnesium-calcium fluorophosphate, cerium activated black-light phosphor of this invention.
Figure 3:
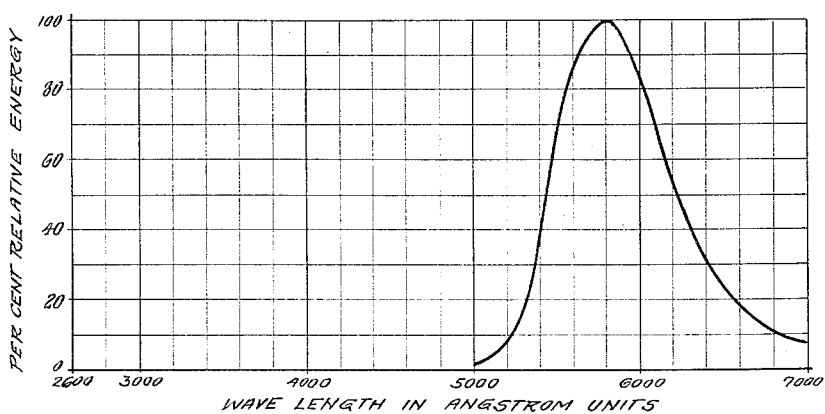
Fig. 3 is a spectral distribution curve of the magnesium-calcium fluorophosphate, cerium and manganese activated yellow phosphor of this invention.

There is illustrated in Fig. 2 a spectral distribution curve for the preferred black-light phosphor of this invention wherein relative energy in arbitrary brightness units is plotted vs. wave length. The output as measured in arbitrary brightness units has a value at 2900 A.U. of about 10% of the maximum output, rises to a relatively sharp maximum peak at about 3400 A.U. and at 4000 A.U. drops to about 10% of the maximum output, thereafter cutting-off at approximately 4250 A.U.

By increasing or decreasing the relative proportions of the material constituents of the phosphor, the output may be decreased from the maximum relative value which is obtained with the optimum formulation, although the spectral distribution for the phosphors incorporating the permissible variations in material constituents, as hereinafter considered, is not affected appreciably. It has been found that the amounts of material constituents making up the phosphor may be varied with respect to one another as indicated in the following table and at the extremes of these limitations the output of the phosphor will be approximately 80% of the output of the optimum formulation. The 80% output figure is arbitrarily selected as dictated by competitive standards for black-light phosphors. Thus the following limitations are only selected arbitrarily as dictated by what constitutes an acceptable competitive phosphor.

TABLE 1

[Material constituents (represented in relative molar proportions with respect to one mole of $P_2O_5$)]

| Material | Optimum | Minimum | Maximum |
|---|---|---|---|
| MgO | 2.25 | 2.15 | 2.35 |
| CaO | 0.75 | 0.70 | 0.85 |
| $P_2O_5$ | 1.00 | 1.00 | 1.00 |
| $CaF_2$ | 2.80 | 2.50 | 3.30 |
| Ce | 0.04 | 0.02 | 0.10 |

It should be noted that since the spectral distribution of the phosphor is not altered appreciably by varying with respect to one another the proportions of the material constituents, it would appear that a definite crystal structure or matrix has been formed. This is true for both the black-light and yellow phosphors of this invention.

In the making the preferred black-light phosphor of this invention, the following raw mix components may be used in the following proportions:

Example I

| Components: | Molar proportions |
|---|---|
| $Mg_2P_2O_7$ | 2.1 |
| $CaF_2$ | 6.8 |
| Ce (as cerous carbonate) | 0.08 |

NOTE.—2% by phosphor weight of $NH_4F$ may be included, if desired, to prevent loss of fluorine through volatilization.

Example II

| Components: | Molar proportions |
|---|---|
| $Mg_3(PO_4)_2$ | 0.75 |
| $Ca_3(PO_4)_2$ | 0.25 |
| $CaF_2$ | 2.80 |
| Ce (as cerous carbonate) | 0.04 |

NOTE.—2% by phosphor weight of $NH_4F$ may be included, if desired, to prevent loss of fluorine through volatilization.

These raw mix components may be fired in covered crucibles under normal atmospheric conditions at a temperature of from 800° C. to 900° C. for from ½ to 2 hours. Neither the firing nor the firing temperature are particularly critical and may be varied. After firing the phosphor is ball-milled for about 1 to 3 hours, although this ball-milling time is not critical. The firing and ball-milling should be repeated and on refiring about 2% by phosphor weight of $NH_4F$ should be added to prevent any loss of fluorine.

Many other raw mix materials may be substituted for those given in the examples as is obvious to one skilled in the art. For example, mixtures of $MgCO_3$ or MgO and $(NH_4)_2HPO_4$ may be substituted for $Mg(PO_4)_2$, and the resulting phosphor composition, after firing, will be the same.

While the examples, as given, will result in the preferred embodiment of the phosphor, variations in the proportions of the raw mix components will produce phosphors whose material constituents fall within the heretofore presented permissible phosphor material constituent ranges. These raw mix component variations may be readily accomplished by varying the proportions of the raw mix components by amounts which correspond to the permissible variations in the proportions of the material constituents of the phosphor.

The black-light phosphor, previously described, may be made to fluoresce in the yellow range of the spectrum by the addition of controlled amounts of manganese activator. The spectral distribution for this yellow phosphor peaks at approximately 5800 A.U. and cuts off at about 5000 A.U. at the shorter wave lengths.

This yellow phosphor may be defined broadly as magnesium-calcium fluorophosphate, activated by cerium and manganese. The general formula for the preferred embodiment of this phosphor may be represented as $0.75Mg_3(PO_4)_2 \cdot 0.25Ca_3(PO_4)_2 \cdot 2.9CaF_2 : 0.20Mn : 0.04Ce$ or expressing the alkaline earth materials in whole numbers, $3Mg_3(PO_4)_2 \cdot 1Ca_3(PO_4)_2 \cdot 11.6CaF_2 : 0.80Mn : 0.16Ce$.

While the foregoing formula is an accurate representation of the preferred embodiment of the phosphor, the phosphor may be represented better by what might be termed the amounts of the various material constituents of the phosphor, since the alkaline earth metals and the phosphates need not be present in stoichiometric proportions. The foregoing formula may be rearranged to express the molecular proportions of the material constituents of the phosphor as follows:

$9MgO \cdot 3CaO \cdot 4P_2O_5 \cdot 11.6CaF_2 : 0.80Mn : 0.16Ce$

By increasing or decreasing the relative proportions of the material constituents of the phosphor, the output may be decreased from the maximum relative value which is obtained with the optimum formulation, as was the case in the previously considered black-light phosphor. As with the black-light phosphor, a variation in the relative proportions of material constituents from the optimum does not appear to shift the spectral distribution, but rather effects the relative output, and the extremes of the following material constituent limitations represent an output of 80% of the brightness of the preferred embodiment of the phosphor.

TABLE II

[Material constituents (represented in relative molar proportions with respect to one mole of $P_2O_5$.)]

| Material | Optimum | Minimum | Maximum |
|---|---|---|---|
| MgO | 2.25 | 2.15 | 2.35 |
| CaO | 0.75 | 0.70 | 0.85 |
| $P_2O_5$ | 1.00 | 1.00 | 1.00 |
| $CaF_2$ | 2.80 | 2.50 | 3.30 |
| Ce | 0.04 | 0.02 | 0.10 |
| Mn | 0.20 | 0.10 | 0.40 |

In making the preferred yellow phosphor of this invention, the following raw mix components may be mixed in the following proportions:

Example III

| Components: | Molar proportions |
|---|---|
| $Mg_3(PO_4)_2$ | 0.75 |
| $Ca_3(PO_4)_2$ | 0.25 |
| $CaF_2$ | 2.80 |
| Mn (as carbonate) | 0.20 |
| Ce (as carbonate) | 0.04 |

NOTE.—2% by phosphor weight of $NH_4F$ may be included, if desired, to prevent loss of fluorine through volatilization.

Example IV

| Components: | Molar proportions |
|---|---|
| $MgCO_3$ | 2.4 |
| $(NH_4)_2HPO_4$ | 2.5 |
| $CaF_2$ | 3.8 |
| Mn (as carbonate) | 0.27 |
| Ce (as carbonate) | 0.43 |

NOTE.—2% by phosphor weight of $NH_4F$ may be included, if desired, to prevent loss of fluorine through volatilization.

Example V

| Components: | Molar proportions |
|---|---|
| $Mg_2P_2O_7$ | 1.2 |
| $CaF_2$ | 3.8 |
| Mn (as carbonate) | 0.25 |
| Ce (as carbonate) | 0.045 |

NOTE.—2% by phosphor weight of $NH_4F$ may be included, if desired, to prevent loss of fluorine through volatilization.

These raw mix components after thoroughly mixing may be fired in a covered crucible in an air atmosphere at a temperature of from 800° C. to 900° C. for approximately ½ to 2 hours, neither the firing time nor the firing temperature being critical. The fired phosphor may then be ball-milled for 1 to 3 hours although this ball-milling time is not critical and the firing and ball-milling should be repeated. On refiring about 2% by phosphor weight of $NH_4F$ should be added to prevent any loss of fluorine. Other raw mix components may be substituted for those given in the examples, as was heretofore pointed out in discussing the preparation of the black-light phosphor.

As with the black-light phosphor of this invention, variations from the preferred embodiment of the phosphor may be prepared readily by varying the proportions of the raw mix components in amounts which correspond to the permissible variations in the proportions of the material constituents for the phosphor.

It will be recognized that the objects of the invention have been achieved by providing a black-light phosphor which has a very sharp cut off at about 4250 A.U and a spectral distribution which is peaked at about 3400 A.U. In addition, there has been provided a phosphor which fluoresces in the yellow range of the spectrum under 2537 A.U. excitation. A method of preparing the foregoing phosphors has also been provided.

As a possible alternative embodiment, the cerium activator may be replaced by lead, tin or bismuth which serve as primary activators with manganese. Such variations in activators will produce usable phosphors. In addition, lead, tin, bismuth, or mixtures thereof, may be used as primary activators without the addition of manganese.

As a further possible alternative embodiment, strontium fluoride may be substituted for calcium fluoride to produce effective phosphors. In the case of the yellow phosphor, the substitution of strontium fluoride for the calcium fluoride will shift the emission toward the green.

While in accordance with the patent statutes one embodiment of the invention has been illustrated and described in detail, it is to be particularly understood that the invention is not limited thereto or thereby.

I claim:
1. A phosphor material consisting essentially of an activated matrix of the following materials in the following proportions: 2.15 to 2.35 moles MgO and 0.70 to 0.85 mole CaO per 1 mole of $P_2O_5$; 2.50 to 3.30 moles $CaF_2$; and activated by one of the group consisting of 0.02 to 0.10 mole of Ce and 0.02 to 0.10 mole Ce+0.10 to 0.40 mole Mn.
2. A phosphor material consisting essentially of an activated matrix of the following materials in the following proportions: 2.25 moles MgO and 0.75 mole CaO per 1 mole of $P_2O_5$; 2.80 moles $CaF_2$; and activated by one of the group consisting of 0.04 mole of Ce and 0.04 mole Ce+0.20 mole Mn.
3. The method of preparing a luminescent material which method comprises, mixing compounds of magnesium, calcium, phosphorus, fluorine and one of the group consisting of cerium and cerium+manganese in proportions to yield upon firing the following compounds in the following proportions: 2.15 to 2.35 moles MgO and 0.70 to 0.85 mole CaO per 1 mole of $P_2O_5$; 2.50 to 3.30 moles $CaF_2$; and activated by one of the group consisting of 0.02 to 0.10 mole of Ce and 0.02 to 0.10 mole Ce+0.10 to 0.40 mole Mn.
4. A phosphor material which under 2537 A.U. excitation has a radiation which is predominantly in the black-light range of the spectrum, said phosphor consisting essentially of an activated matrix of the following materials in the following proportions: 2.15 to 2.35 moles MgO and 0.70 to 0.85 mole CaO per 1 mole of $P_2O_5$; 2.60 to 3.20 moles $CaF_2$; and activated by 0.02 to 0.10 mole of Ce.
5. A phosphor material which under 2537 A.U. excitation has a radiation which is peaked in the yellow range of the spectrum, said phosphor consisting essentially of an activated matrix of the following materials in the following proportions: 2.15 to 2.35 moles MgO and 0.70 to 0.85 mole CaO per 1 mole of $P_2O_5$; 2.60 to 3.20 moles $CaF_2$; and activated by 0.02 to 0.10 mole Ce and 0.10 to 0.40 mole Mn.
6. A luminescent composition consisting essentially of the fired reaction product of the following constituents in about the stated proportions: magnesium pyrophosphate, 2.1 moles; calcium fluoride, 6.8 moles; and cerous carbonate, 0.08 mole.

References Cited in the file of this patent

UNITED STATES PATENTS

| | | |
|---|---|---|
| 2,306,567 | Roberts | Dec. 29, 1942 |
| 2,476,654 | Froelich | July 19, 1949 |
| 2,488,733 | McKeag | Nov. 22, 1949 |
| 2,575,754 | Froelich | Nov. 20, 1951 |
| 2,592,261 | Fonda | Apr. 8, 1952 |
| 2,664,401 | McKeag | Dec. 29, 1953 |
| 2,750,344 | Kroger | June 12, 1956 |

FOREIGN PATENTS

| | | |
|---|---|---|
| 512,154 | Great Britain | Aug. 30, 1939 |
| 829,626 | Germany | Dec. 27, 1951 |
| 701,031 | Great Britain | Dec. 16, 1953 |

OTHER REFERENCES

Froelich: J. Electrochem. Soc., October 1951, vol. 98, No. 10, pp. 400–405.